United States Patent
Koertel

(10) Patent No.: US 7,533,194 B2
(45) Date of Patent: May 12, 2009

(54) MULTI-MODE PORT IN A NETWORK DEVICE FOR SERIAL AND NETWORK COMMUNICATION

(75) Inventor: Andreas H. Koertel, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 11/011,622

(22) Filed: Dec. 13, 2004

(65) Prior Publication Data

US 2006/0129702 A1 Jun. 15, 2006

(51) Int. Cl.
*G06F 3/00* (2006.01)
*G06F 13/12* (2006.01)
*H01R 13/64* (2006.01)

(52) U.S. Cl. ............... 710/8; 710/14; 710/65; 439/677

(58) Field of Classification Search ............ 710/65; 439/677

See application file for complete search history.

(56) References Cited

U.S. PATENT DOCUMENTS

| | | | | |
|---|---|---|---|---|
| 5,340,333 | A * | 8/1994 | Schroth | 439/607 |
| 6,584,519 | B1 * | 6/2003 | Russell | 710/62 |
| 2001/0047441 | A1 * | 11/2001 | Robertson | 710/65 |
| 2005/0186854 | A1 * | 8/2005 | Huang | 439/677 |

OTHER PUBLICATIONS

SB4200 Cable Modem, Motorola, 2002, http://broadband.motorola.com/modem/sb4200.pdf.*
Linksys BEFSRU31 EtherFast Cable/DSL Router with USB & 3-Port 10/100 Switch, Product Overview: http://www.amazon.com/Linksys-BEFSRU31—EtherFast-Router-3-Port/dp/B00005AFIT, Date first available at amazon.com: Mar. 27, 2001, Product Features and Technical Details: http://www.amazon.com/Linksys-BEFSRU31-EtherFast—Router-3-Port/dp/tech-data/B00005AFIT/ref=d.*
Crisco Console RJ45 to DB9 Pin Cable, May 6, 2003, http://web.archive.org/web/20030506084553/http://www.technick.net/public/code/cp_dpage.php?aiocp_dp=pincabser_cisco_9.*
Definition of Port, 1999, Dictionary of Multimedia and Internet Applications: A Guide for Developers and Users, http://xreferplus.com/entry.jsp?xrefid=3481298&secid=-&hh=1.*

* cited by examiner

*Primary Examiner*—Henry W. H. Tsai
*Assistant Examiner*—Kris Rhu

(57) ABSTRACT

In one embodiment of the invention, a method for providing a multi-mode port in a network device, includes: setting a first mode on the port, wherein the network device can perform serial communication on the port; and setting a second mode on the port, wherein the network device can perform network communication on the port. In another embodiment of the invention, an apparatus for enabling a multi-mode port in a network device, includes an adapter configured for attachment to and detachment from a connector of a port in the network device; wherein the network device can perform serial communication on the port in a first mode; and wherein the network device can perform network communication on the port in a second mode.

20 Claims, 4 Drawing Sheets

MULTI-MODE PORT IN A NETWORK DEVICE FOR SERIAL AND NETWORK COMMUNICATION

TECHNICAL FIELD

Embodiments of the invention relate generally to communication networks, and more particularly to a multi-mode port in a network device. As an example, an embodiment of the invention permits the use of a standard Ethernet port and RJ45 connector for serial console access to a network device and for network communication by the network device.

BACKGROUND

In conventional network devices (e.g., network switches or routers), forty-eight (48) network port connectors typically occupy a substantial portion of the front panel of the network device. Typically, an RJ45 connector is used as a network port connector. On the other hand, the serial port connector is a connector that consumes substantial space on the network device. Typically, the RS232 DB9 connector is used as a serial port connector. If the serial port connector is placed on the network device front panel, then the serial port connector will require the elimination of six current network ports from the network device front panel. It would be advantageous to not eliminate any of the current network ports in the front panel, so that various features can be implemented or supported on the network device.

In other conventional network devices, if the serial port connector is not placed in the front panel, then the serial port connector is typically placed in a location that is usually not very accessible on the network device (e.g., the back or rear portion of the network device). By placing the serial port connector in the back or rear portion of the device, network personnel are subjected to significant inconvenience when attempting to access the serial port connector, particularly if the network device is already mounted on a rack.

Therefore, the conventional technology is limited in its capabilities and suffers from at least the above constraints and deficiencies.

SUMMARY OF EMBODIMENTS OF THE INVENTION

In one embodiment of the invention, a method for providing a multi-mode port in a network device, includes: setting a first mode on the port, wherein the network device can perform serial communication on the port; and setting a second mode on the port, wherein the network device can perform network communication on the port.

In another embodiment of the invention, an apparatus for enabling a multi-mode port in a network device, includes: an adapter configured for attachment to and detachment from a connector of a port in the network device; wherein the network device can perform serial communication on the port in a first mode; and wherein the network device can perform network communication on the port in a second mode.

These and other features of an embodiment of the present invention will be readily apparent to persons of ordinary skill in. the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Embodiments of the invention relate generally to communication networks, and more particularly to a multi-mode port in a network device. As an example, an embodiment of the invention permits the use of a standard Ethernet port and RJ45 connector for serial console access to a network device and for network communication by the network device. One specific embodiment of the invention permits a standard Ethernet 10/100 port to be used as either a network port and/or as a console RS232 port by use of a passive adapter as discussed below. In another embodiment of the invention, a smart adapter permits a Gigabit (10/100/100) port to be used as either a network port and/or as a console RS232 port by use of the smart adapter that negotiates with and changes the behavior of the Gigabit port.

Figure 1:
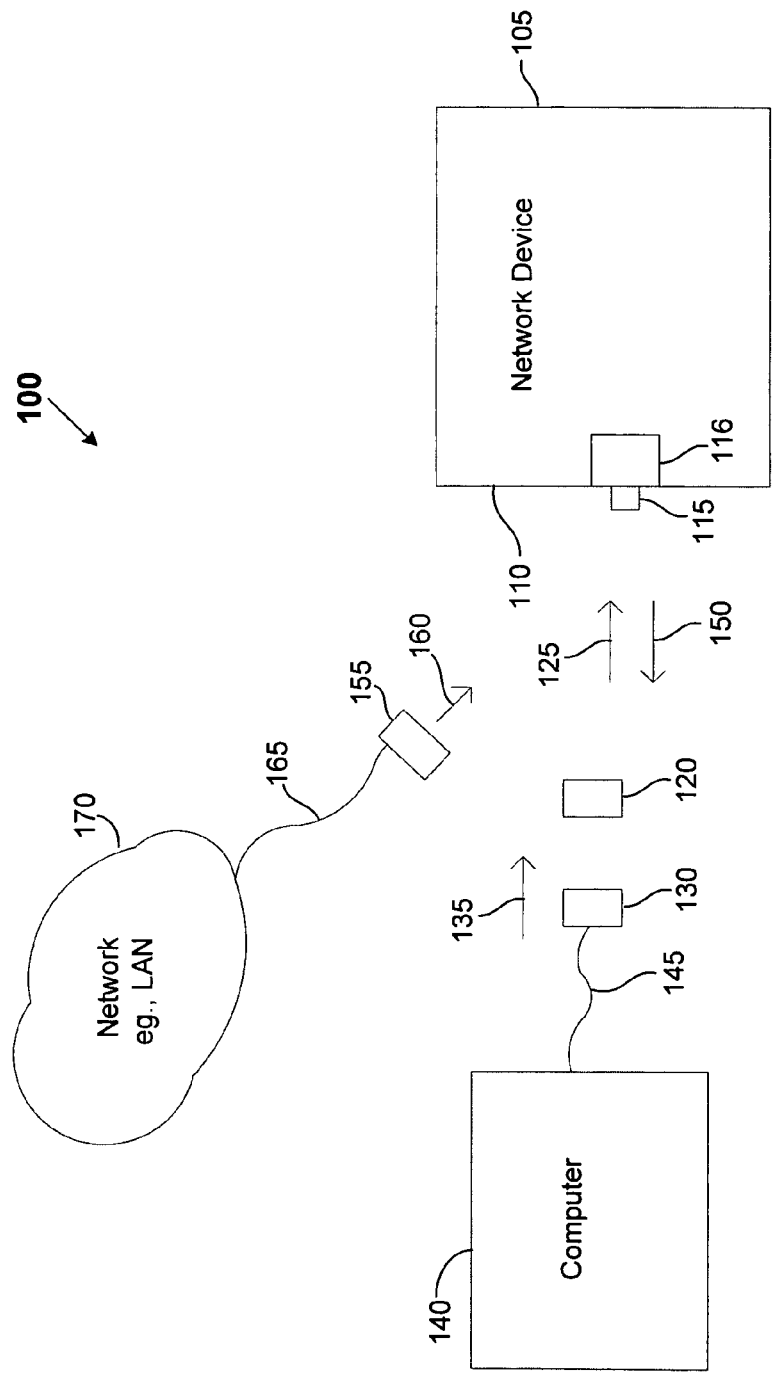
FIG. 1 is a block diagram of a network system that includes an embodiment of the invention.

FIG. 1 is a block diagram of a network system 100 that includes an embodiment of the invention. A network device 105 includes a front panel 110 that supports multiple network port connectors. The network device 105 may be, for example, a switch or router or other suitable network device. Typically there are forty-eight (48) network port connectors that are supported by the front panel 110. For purposes of describing an operation of an embodiment of the invention, only one network port connector 115 is shown on the front panel 110. However, any suitable number of network port connectors can be supported by the front panel 115. The network port connector 115 is typically an RJ45 connector (or another suitable equivalent type of connector) that is attached to the front panel 110. As known to those skilled in the art, an RJ45 (Registered Jack-45) connector is an 8-pin connector that is used in networking.

The network port connector 115 permits signal transmission to and from a port 116 in the network device 105. As known to those skilled in the art, a network device will have multiple ports for receiving and transmitting signals.

In a conventional network device, a serial port connector (i.e., console port connector) is also attached to the conventional network device, and the serial port connector is used for purposes of configuring the conventional network device. Typically, the serial port connector is placed in the back or rear side of the conventional network device. A DB9 serial connector is typically used as the serial port connector. As known to those skilled in the art, the DB9 connector is a connector used for RS-232 connections and for several video interfaces on IBM-compatible computers and/or other suitable applications. As also known to those skilled in the art, RS-232 is a standard for serial binary data interchange between a data terminal equipment and a data communication equipment. The serial port connector permits signals to be received to and transmitted from a console port. If the serial port connector is placed on the front panel of the conventional network device, then, typically, approximately six (6) of the 48 network port connectors will be removed from the front panel, since the serial port connector will occupy a large area amount of the front panel.

In contrast, an embodiment of the invention provides an adapter 120 that permits a network port connector (network port connector 115 in the example of FIG. 1) to be used for network communication (in one mode) and for serial communication (in another mode). Therefore, the use of the adapter 120 permits a network port 116 to function as a multi-mode port. The adapter 120 advantageously eliminates the prior need to use a separate serial connector on a network device. The adapter is shown in additional details in FIG. 2.

The adapter 120 is attached (125) to the network port connector 115, and a serial connector 130 is attached (135) to the adapter 120, where the serial connector 130 is attached to a link 145 which is also attached to a computer 140. The computer 140 can then be used to perform serial communication with the network device 105, so that the computer 140 is used to configure the network device 105 via link 145. The link 145 is typically a suitable cable that can be used to transmit control signals from the computer 140 to the network device 105. The computer 140 is used, for example, to assign an Internet Protocol (IP) address to the network device 105, to configure the ports in the network device 105, to define a virtual LAN for the network device 105, to define a host name, to define a default gateway, or/and other configuration and management operations. Therefore, the network port 116 can be used for receiving and sending RS232 serial configuration signals in this first mode, when the adapter 120 is attached to the network port connector 115.

When the adapter 120 is detached (150) from the network port connector 115 (or when the adapter is not attached to the network port connector 115) and a network connector 155 is attached (160) to the network port connector 115, then the network device 105 will be connected via link 165 to a network 170. Therefore, the network device 105 can perform network communication with other devices on the network 170. The network 170 can be, for example, a local area network (LAN) that is based on the Ethernet technology or another type of network. Therefore, the network port 116 is used for network communication in this second mode, when the adapter 120 is removed from the network port connector 115 and when the network connector 155 is attached to the network port connector 115.

Figure 2:
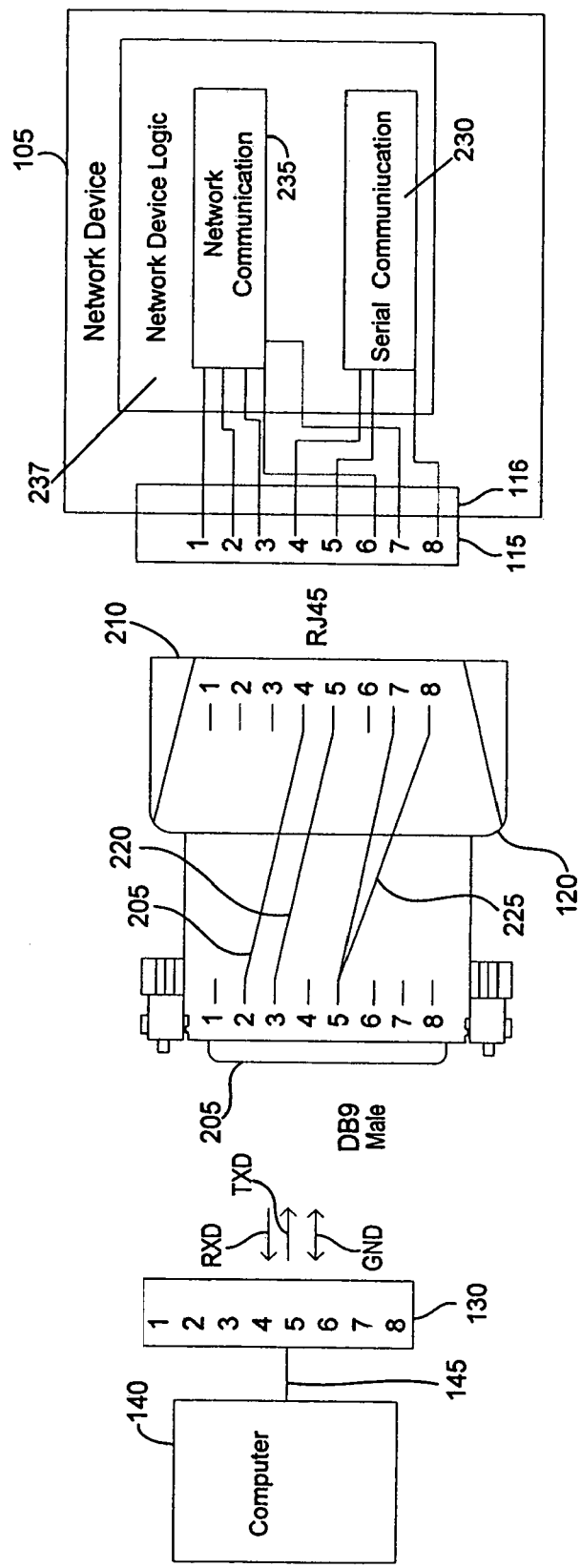
FIG. 2 is a block diagram that illustrates the details of an adapter, in accordance with an embodiment of the invention.

FIG. 2 is a block diagram that illustrates the details of an adapter 120, in accordance with an embodiment of the invention. For purposes of describing the functionalities of embodiments of the invention, the components shown in FIG. 2 are not necessarily drawn to scale.

For purposes of describing the features of the adapter 120, assume that the connector 115 on the network device 105 is an RJ45 connector, and the connector 130 on the cable 145 from computer 140 is a DB9 connector.

In an RJ45 connector, the pins 1 to 3, and 6 are used for network communications under the Ethernet technology. Therefore, an embodiment of the invention will use pins 4, 5, 7, and 8 on the RJ45 connector 115 for serial communications, as described below.

In a DB9 connector 130, pin 2 is used for the received data (RXD), pin 3 is used for the transmitted data (TXD), and pin 5 is used for the signal ground (GND). Of course, as an alternative, pin 2 may be used for the transmitted data (TXD) and pin 3 may be used for the received data (RXD).

The adapter 120 includes a DB9 side (i.e., first side) 205 and an RJ45 side (i.e., second side) 210. The DB9 connector 130 is connectable to and detachable from the DB9 side 205 of the adapter 120. The RJ45 side 210 of the adapter 120 is connectable to and detachable from the RJ45 connector 115.

In the adapter 120, pin 2 on the DB9 side 205 is electrically coupled to pin 4 on the RJ45 side 210. For example, a conductor 215 may be used to electrically couple pin 2 on the DB9 side 205 to pin 4 on the RJ45 side 210. Other techniques known to those skilled in the art may be used to electrically couple the pins described above. Therefore, the conductor 215 is not used in other configurations.

In the adapter 120, pin 3 on the DB9 side 205 is electrically coupled to pin 5 on the RJ45 side 210. For example, a conductor 220 may be used to electrically couple pin 3 on the DB9 side 205 to pin 5 on the RJ45 side 210.

In the adapter 120, pin 5 on the DB9 side 205 is electrically coupled to pins 7 and 8 on the RJ45 side 210. For example, a conductor 225 may be used to electrically couple pin 5 on the DB9 side 205 to pins 7 and 8 on the RJ45 side 210.

To connect the adapter 120 to the network port connector 115 on the network device 105, any 8-pin cable with RJ45 connectors could be used. The cable 145 should preferably be CAT5 (Category 5) or better. Alternatively, the cable 145 may be an 8-pin modular Telco cable. CAT3 cable will typically not be proper for use, since this cable type has only 2 pairs of wires and therefore, the utilized pins (pins 4, 5, 7, and 8) on the RJ45 connector 115 will not be connected.

For serial communication, only 3 wires (in the cable 145) and 3 pins will be required. These wires will be used for the receive signal (RXD), transmit signal (TXD), and ground (GND). The RXD and TXD signals are the RS232 signals that are used in configuring and managing the network device 105, as known to those skilled in the art. When the adapter 120 is connected to the RJ45 connector 115 and to the DB9 connector 130, the receive signal (RXD) will transmit from the serial communication module 230 to pin 4 (on the RJ45 connector 115 and on the RJ45 side 210), and along conductor 215 to pin 2 (on the DB9 side 205 and on the DB9 connector 130), and then along cable 145 to the computer 140.

When the adapter 120 is connected to the RJ45 connector 115 and to the DB9 connector 130, the transmit signal (TXD) will transmit from the computer 140 along cable 145 to pin 3 (on the DB9 connector 130 and on the DB9 side 205), and along conductor 220 to pin 5 (on the RJ45 side 210 and on the RJ45 connector 115), and then to the serial communication module 230.

Alternatively, the RXD signal may instead transmit along pin 5 (on the RJ45 connector 115 and on the RJ45 side 210) to pin 3 (on the DB9 side 205 and on the DB9 connector 130). In this alternative configuration, the TXD signal would instead transmit along pin 2 (on the DB9 connector 130 and on the DB9 side 205) to pin 4 (on the RJ45 side 210 and on the RJ45 connector 115).

When the adapter 120 is connected to the RJ45 connector 115 and to the DB9 connector 130, the GND reference value along pin 5 (on the DB9 connector 130 and DB9 side 205) will also pull the pins 7 and 8 (on the RJ45 side 210 and on the RJ45 connector 115) to the same GND reference value. This GND reference value at pins 7 and 8 (on the RJ45 connector 115) will enable the serial communication logic 230 and disable the network communication logic 235. Standard switching logic may be used to enable and disable the serial communication logic 230 and network communication logic 235, in response to the presence or absence of the GND reference value at pins 7 and 8 on the RJ45 connector 115. The serial communication logic 230 is typically the RS232 logic. The serial communication logic 230 and the network communication logic 235 are part of the network device logic 237 that permits the network device 105 to perform the intended functions or operations. Since the serial communication logic 230 is enabled, initial configuration (or management configuration) can be performed on the serial communication logic 230 in a manner known to those skilled in the art. Since the network communication logic 235 is disabled, network communication is not performed by the network device 105 during serial communication process.

When the adapter 120 is disconnected from the RJ45 connector 115 and the network connector 155 (see FIG. 1) is connected to the RJ45 connector 115, the pins 7 and 8 on the RJ45 connector 115 are not at the ground reference level. Therefore, the GND reference signal is not received by the serial communication module 230 and the network communication module 235. As a result, the serial communication module 230 will be disabled (and serial communication will not be performed by the network device 105), and the network communication module 235 is enabled (and network communication can performed by the network device 105).

Therefore, when the adapter 120 is connected to the RJ45 connector 115 of port 116, the serial communication logic 230 is enabled to permit serial communication between the network device 105 and a computer 140, and the network communication logic 235 is also disabled. When the adapter 120 is disconnected from the RJ45 connector 115 of port 116 and the network connector 155 (FIG. 1) is connected to the RJ45 connector 115, the network communication logic 235 is enabled to permit network communication between the network device 105 and other devices on the network 170 (FIG. 1), and the serial communication logic 230 is also disabled.

The above method permits initial configuration of the RS232 logic 230 in the network device 105 and prevent damage of the RS232 logic 230 if the port 116 is also used as a network port.

As an alternative feature in some embodiments of the invention, an indicator (e.g., a dual color light emitting diode (LED), multiple LEDs, or other indicator devices) can be used to notify the user of the particular mode or state of the network port 116, depending on whether or not the adapter 120 is connected to the RJ45 connector 115 as discussed above.

In another embodiment of the invention, a sense logic in the network device 105 is not used if the sense logic would be unpractical or/and too expensive in a particular application. Instead, a switch (e.g., a small pushbutton switch such as, for example, a recessed reset button in the network device 105 or in the adapter 120) can be used to change the mode or state of the network port 116.

On network device ports that are capable of supporting Gigabit over copper speeds (1000 Mbit), all cable pairs are used in the link to the RJ45 connector 115. When the adapter 120 is currently attached to the network port 116 (via connector 115), the network port 116 would not sense a current network connection, and a state switch logic could turn on the serial communication logic 230 if pins 7 and 8 are connected to ground. The state switch logic could be implemented in the network device logic 237. This configuration would be an inexpensive method to use the same adapter for all types of network devices.

Figure 3:
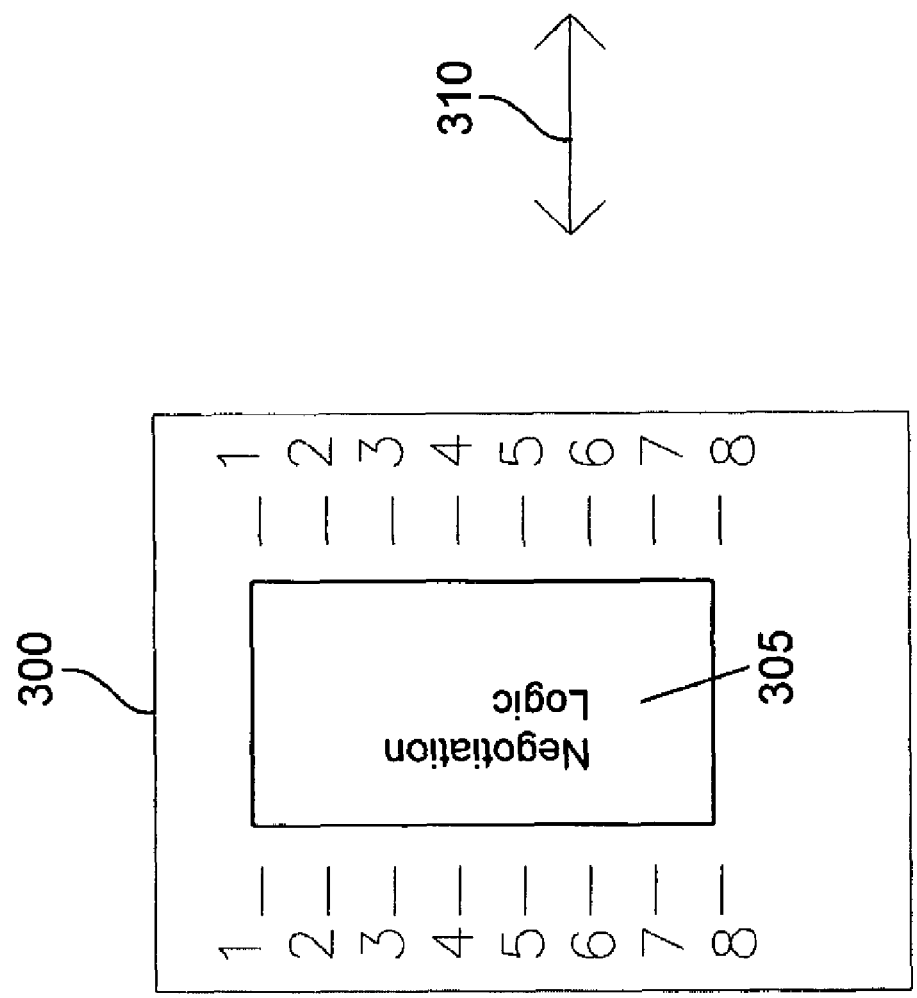
FIG. 3 is a block diagram that illustrates the details of an adapter, in accordance with another embodiment of the invention.

FIG. 3 is a block diagram that illustrates the details of a smart adapter 300, in accordance with another embodiment of the invention. The smart adapter 300 can negotiate with the PHY logic and enable the serial communication logic 230 by this negotiation process 310. This configuration would typically be more expensive to implement due to the additional components that would be required on the smart adapter 300. The smart adapter 300 would include a negotiation logic stage 305 that performs handshaking and negotiation steps with a network device 105. Network handshaking and negotiation techniques are well known to those skilled in the art.

Figure 4:
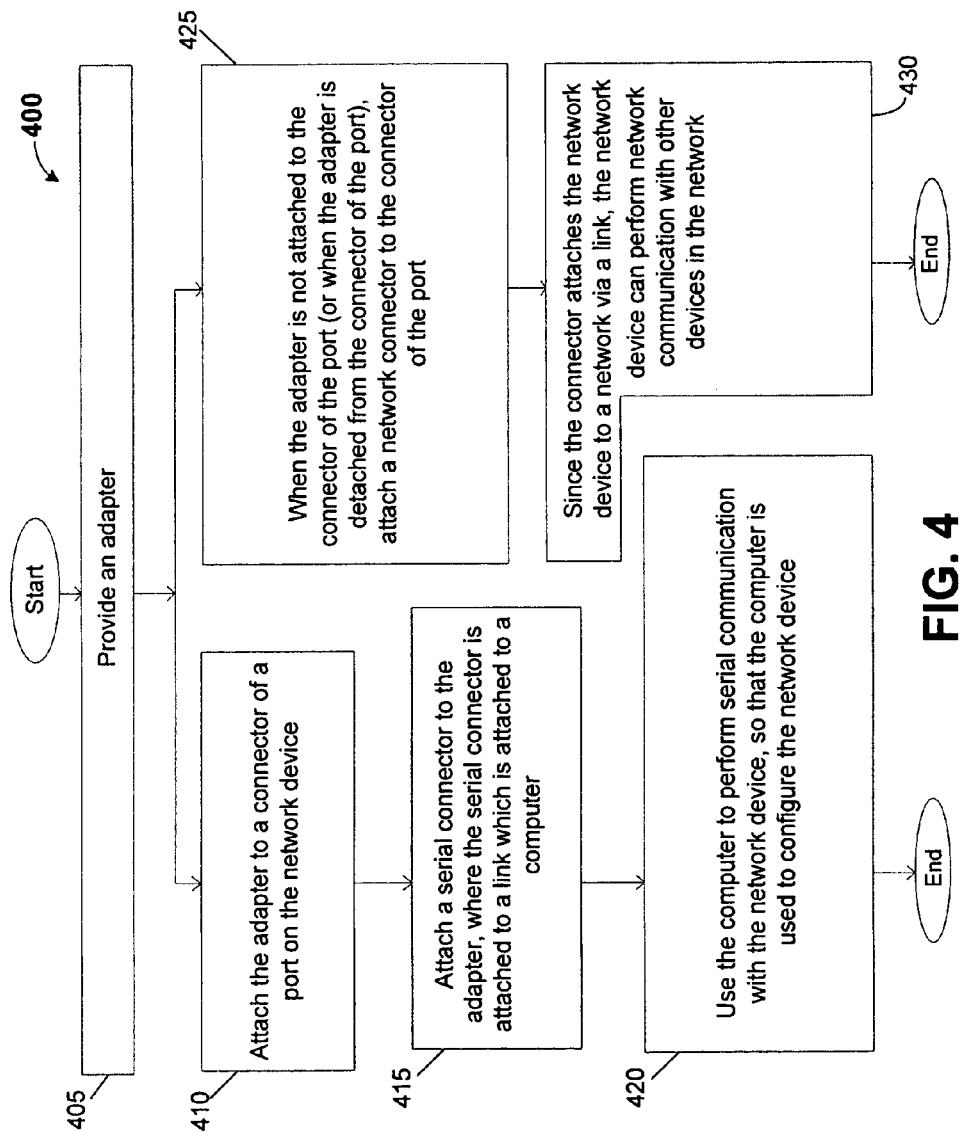
FIG. 4 is a flowchart of a method in accordance with an embodiment of the invention.

FIG. 4 is a flowchart of a method 400 in accordance with an embodiment of the invention. In block 400, an adapter is provided in accordance with an embodiment of the invention.

In block 410, the adapter is attached to a connector of a port on the network device.

In block 415, a serial connector is attached to the adapter, where the serial connector is attached to a link which is attached to a computer.

In block 420, the computer is used to perform serial communication with the network device, so that the computer is used to configure the network device.

In block 425, when the adapter is not attached to the connector of the port (or when the adapter is detached from the connector of the port), a network connector is attached to the connector of the port.

In block 430, the network device can perform network communication with other devices on the network. Network communication is possible because the network connector attaches the network device to the network.

Embodiments of the invention provide two major advantages. First, embodiments of the invention permit the saving of front panel space in the network device, so the use of the limited front panel space is optimized. Second, embodiments of the invention permit the saving of significant costs by not requiring the use of an extra DB9 serial connector on the network device and a cable that is typically custom made. Conventionally, the serial port of a network device is required to be accessed for purposes of initial configuration of the network device or for device recovery or management purposes. One disadvantage of conventional network devices is that the standard DB9 (9 pin) connector is significantly space consuming. In fact, a DB9 connector would occupy the space of six (6) RJ45 connectors that are stacked on top of each other. Since port density in the device front panel is increasingly becoming an issue due to new features being added on network devices, it would be desirable to maintain (or increase, if possible) the number of network ports in the device front panel and to not lose a space in the front panel with the serial port. In embodiment of the invention, for 10/100 ports on a network device, the currently unused pins 4 and 5 on an RJ45 connector (in a 10/100 port) can be used for transmitting and receiving, respectively, of RS232 signals. Alternatively, the unused pins 4 and 5 can be used for receiving and transmitting, respectively, of RS232 signals. Additionally, the pins 7 and 8 on an RJ45 connector can be connected together as ground, for purposes of enabling the RS232 logic in the network device and for purposes of preventing damage to the RS232 logic if the 10/100 port is used as a network port.

Therefore, the embodiments of the invention solve the space and design issues and constraints on most managed network devices by eliminating the use of the bulky DB9 connector for the serial port. Instead, one port (e.g., port 1) on the device front panel can be used as a multi-mode network port and as a management serial port. The state (mode) of the port is changed when the adapter is connected to or removed from the port.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for providing a multimode port in a network device, the method comprising:
    setting a first mode on the multimode port, wherein the network device can perform serial communication on the multimode port by coupling an adapter to the multimode port, wherein the adapter transmits a ground reference signal to the multimode port in order to permit serial communication on the multimode port;
    said adapter comprising a first side including a first side transmit pin, a first side receive pin, and a first side ground pin;
    said adapter further comprising a second side including a second side transmit pin for transmitting data to the multimode port, a second side receive pin for receiving data from the multimode port, and a pair of second side ground pins for transmitting the ground reference signal to the multimode port;
    said first side transmit pin coupled to the second side transmit pin; said first side receive pin coupled to the second side receive pin;
    said first side ground pin coupled to the pair of second side ground pins; and
    setting a second mode on the multimode port, wherein the network device can perform network communication on the multimode port by decoupling the adapter from the multimode port In order to prevent the adapter from transmitting the ground reference signal to the multimode port, thus permitting network communication on the multimode port.

2. The method of claim 1, wherein setting the first mode comprises:
    attaching the adapter to a connector of the multimode port in the network device;
    attaching a serial connector to the adapter, where the serial connector Is attached to a link that Is attached to a computer, and
    using the computer to perform serial communication with the network device.

3. The method of claim 1, wherein setting the second mode comprises:
    detaching the adapter from a connector of the multimode port in the network device and attaching a network connector to the connector of the multimode port in the network device, where the network connector Is attached to a link to a network; and
    performing, by the network device, network communication with another device on the network.

4. The method of claim 1, wherein setting the first mode further comprises:
    sending the ground reference signal to a network communication module in the network device, in order to disable the network communication module; and
    sending the ground reference signal to a serial communication module in the network device, in order to permit serial communication.

5. The method of claim 1, wherein setting the first mode further comprises:
    permitting a transmit signal (TXD) and receive signal (RXD) to be transmitted on the multimode port.

6. The method of claim 1, wherein the network device comprises a switch for setting the first mode or the second mode.

7. The method of claim 1, wherein the network device comprises a router.

8. An apparatus for providing a multi-mode port in a network device, comprising:
    means for setting a first mode on the multi-mode port, wherein the network device can perform serial communication on the multi-mode port by coupling the setting means to the multi-mode port, wherein the setting means transmits a ground reference signal to the multi-mode port in order to permit serial communication on the multi-mode port;
    said setting means comprising a first side including a first side transmit pin, a first side receive pin and a first side ground pin;
    said setting means further comprising a second side including a second side transmit pin for transmitting data to the multi-mode port, a second side receive pin for receiving data from the multi-mode port, and a pair of second side ground pins for transmitting the ground reference signal to the multi-mode port;

said first side transmit pin coupled to the second side transmit pin;

said first side receive pin coupled to the second side receive pin;

said first side ground pin coupled to the pair of second side ground pins; and means for setting a second mode on the multi-mode port, wherein the network device can perform network communication on the multi-mode port by de-coupling the setting means from the multi-mode port in order to prevent the setting means from transmitting the ground reference signal to the multi-mode port, thus permitting network communication on the multi-mode port.

9. An apparatus for enabling a multi-mode port in a network device, the apparatus comprising:

an adapter configured for attachment to and detachment from a connector of the multi-mode port in the network device;

wherein the network device can perform serial communication on the multi-mode port In a first mode by coupling the adapter to the connector, wherein the adapter transmits a ground reference signal to the multi-mode port in order to permit serial communication on the multi-mode port;

said adapter comprising a first side Including a first side transmit pin, a first side receive pin, and a first side ground pin;

said adapter further comprising a second side including a second side transmit pin for transmitting data to the multi-mode port, a second side receive pin for receiving data from the multi-mode port, and a pair of second side ground pins for transmitting the ground reference signal to the multi-mode port;

said first side transmit pin coupled to the second side transmit pin; said first side receive pin coupled to the second side receive pin;

said first side ground pin coupled to the pair of second side ground pins; and wherein the network device can perform network communication on the multi-mode port in a second mode by de-coupling the adapter from the connector in order to prevent the adapter from transmitting the ground reference signal to the multi-mode port, thus permitting network communication on the multi-mode port.

10. The apparatus of claim 9, wherein the first mode is set when the adapter is connected to the connector of the multi-mode port and wherein the second mode is set when the adapter Is disconnected from the connector.

11. The apparatus of claim 9, wherein the first mode permits a computer to perform serial communication with the network device.

12. The apparatus of claim 9, wherein the second mode permits the network device to perform network communication with another device on a network.

13. The apparatus of claim 9, wherein the adapter sends the ground reference signal to a network communication module in the network device, in order to disable the network communication module, and ends the ground reference signal to a serial communication module in the network device, in order to permit serial communication.

14. The apparatus of claim 9, wherein the adapter sends a transmit signal (TXD) to and receives signal (RXD) from the multi-mode port.

15. The apparatus of claim 9, herein the network device comprises a switch for setting the first mode or the second mode.

16. The apparatus of claim 9, wherein the network device comprises a router.

17. The apparatus of claim 9, wherein the adapter includes the first side configured to connect to or detach from a serial connector and the second side configured to connect to or detach from a connector multi-mode port of the network device.

18. The apparatus of claim 17, wherein the first side of the adapter includes a plurality of first pins at least one of which is the first side ground pin, wherein the second side of the adapter Includes a plurality of second pins at least two of which are the pair of second side ground pins, wherein one of the second side ground pins connects to a ground signal input of a network communication module in the network device when the adapter is connected to the connection multi-mode port of the network device, wherein another of the second side ground pins connects to a ground signal input of a serial communication module in the network device when the adapter is connected to the connection multi-mode port of the network device, and wherein the first side ground pin of the first side is connected to the at least two second side grounds pins of the second side.

19. The apparatus of claim 18, wherein the first side ground pin of the first side connects to a ground reference pin of the serial connector when the adapter is connected to the serial connector.

20. The apparatus of claim 8, wherein the setting means comprises adapter means connectable to or detachable from the multi-mode port of the network device, wherein the first mode is set when the adapter means is connected to the multi-mode port of the network device and the second mode is set when the adapter means is detached from the multi-mode port of the network device, wherein in the first mode, the adapter means supplies a ground reference signal received from a serial device connected to the adapter means to a network communication means of the network device and to a serial communication means of the network device, and wherein the network communication means disables itself when the ground reference signal is received by the network communication means from the adapter means and the serial communication means enables itself when the ground reference signal is received by the serial communication means from the adapter means.

* * * * *

UNITED STATES PATENT AND TRADEMARK OFFICE
CERTIFICATE OF CORRECTION

PATENT NO. : 7,533,194 B2 Page 1 of 1
APPLICATION NO. : 11/011622
DATED : May 12, 2009
INVENTOR(S) : Andreas H. Koertel It is certified that error appears in the above-identified patent and that said Letters Patent is hereby corrected as shown below:

In column 8, line 12, in Claim 1, delete "In" and insert -- in --, therefor.

In column 8, line 22, in Claim 2, after "connector" delete "Is" and insert -- is --, therefor.

In column 8, line 22, in Claim 2, after "that" delete "Is" and insert -- is --, therefor.

In column 8, line 31, in Claim 3, delete "Is" and insert -- is --, therefor.

In column 9, line 23, in Claim 9, delete "In" and insert -- in --, therefor.

In column 9, line 28, in Claim 9, delete "Including" and insert -- including --, therefor.

In column 9, line 51, in Claim 10, delete "Is" and insert -- is --, therefor.

In column 10, line 7, in Claim 15, delete "herein" and insert -- wherein --, therefor.

In column 10, line 20, in Claim 18, delete "Includes" and insert -- includes --, therefor.

Signed and Sealed this

Twenty-third Day of February, 2010

David J. Kappos
*Director of the United States Patent and Trademark Office*